United States Patent [19]

Nakashima

[11] Patent Number: 4,945,298
[45] Date of Patent: Jul. 31, 1990

[54] MOTOR DRIVING APPARATUS

[75] Inventor: Hiroshi Nakashima, Aichi, Japan

[73] Assignee: Aisin Seiki Kabushiki Kaisha, Kariya, Japan

[21] Appl. No.: 306,729

[22] Filed: Feb. 6, 1989

[30] Foreign Application Priority Data

Feb. 5, 1988 [JP] Japan .................. 63-25257

[51] Int. Cl.⁵ .............................. G05B 11/01
[52] U.S. Cl. ................... 318/635; 318/434; 318/566; 318/476; 361/31
[58] Field of Search .................. 361/23–24, 361/30–31, 78–79, 88–90; 318/466–469, 449–450, 476, 563–566, 635, 434, 599; 180/79.1

[56] References Cited

U.S. PATENT DOCUMENTS

| 4,093,901 | 6/1978 | Rose | 361/30 |
|---|---|---|---|
| 4,255,694 | 3/1981 | Morris et al. | 361/30 |
| 4,290,000 | 9/1981 | Sun | 361/30 |
| 4,611,682 | 9/1986 | Yasuda et al. | 361/24 |
| 4,614,248 | 9/1986 | Kakinami et al. | 361/31 |
| 4,765,426 | 8/1988 | Shimizu | 361/23 |
| 4,780,656 | 10/1988 | Mitchell | 361/30 |

Primary Examiner—William M. Shoop, Jr.
Assistant Examiner—David Martin
Attorney, Agent, or Firm—Sughrue, Mion, Zinn, Macpeak & Seas

[57] ABSTRACT

A motor driving apparatus includes a motor, a signal generating device for generating a Pulse Width Modulation binary signal, a control device for applying a current to the motor, a current detecting device for detecting the current applied to the motor, and a current blocking device for blocking the current applied to the motor for a predetermined time when the current applied to the motor exceeds a predetermined value. The current blocking device is synchronized at an alternative cycle of the binary signal, whereby it is possible to limit the current applied to the motor during the overload of the motor.

5 Claims, 8 Drawing Sheets

MOTOR DRIVING APPARATUS

FIELD OF THE INVENTION

The present invention is provides a motor driving apparatus for controlling the electrical connection of a motor (below referred to as PWM control) via Pulse Width Modulation signal (below referred to as PWM signal).

BACKGROUND OF THE INVENTION

A motor has been used as the driving source in a power steering apparatus or in an industrial robot, etc. Such an apparatus has often performed PWM control to accurately control the output torque of the motor (for example, Patent Publication No. sho 60-131093).

FIG. 7 is an example of the motor driving circuit used in a conventional electrical power steering, in which the circuit is connected to a microcomputer (not shown) to control it. That is, as show in in FIG. 7, OP 0 to 9 and IP 2 are the input and output ports of the microcomputer, respectively. OP 0 to 7 output the data indicating the on duty of a PWM control (below referred to as a PWM data), and OP 8 and 9 output the control signals (below referred to as a direction control signal) for controlling the forward and reverse rotations of motor 8. Herein, PWM data is the data of 1 to 100 given by a binary number. The direction control signal is output as a high level at OP 8 during forward rotation, as a low level at OP 9 during reverse rotation and as a low level at both ports during the disconnection of the power source from the motor.

PWM data is supplied to PWM unit 210. PWM unit 210 comprises register 211 for storing PWM data, clock CLK for generating the clock pulse of 1.5 MHz, 100 binary counter 212 for counting the clock pulse, comparator 213 for comparing the counting data of counter 212 with PWM data, which register 211 stores therein, and AND gate AN3. Counter 212 counts the value of 1 to 99, repeatedly. Comparator 213 outputs the high level when the counting data is less than the PWM data and the low level when the counting data is more than the PWM data. Therefore, a PWM signal of 15 MHz with the high level being continued between the on duties is generated.

The PWM signal is input to one input terminal of AND gate AN3 which has two input terminals. The other input terminal of AND gate AN3 receives a current limiting signal from current limiting unit 230, but it is now assumed that this signal is at a high level.

The output of PWM unit 210, for example, the output of AND gate AND3 (below referred to as the current controlling signal), is applied one input terminal of each of the AND gates AN1 and AN2. The other input terminal of AND gate AN1 is connected to output port OP8, and the other input terminal of AND gate AN2 is connected to output port OP9. That is to say, when the direction control signal from OP8 is at a high level, the current control signal is output from AND gate AN1. When OP9 outputs the high level, the current control signal is output from AND gate AN2.

The output from AND gate AN1 is applied to FET driver 222 and the output of AND gate AN2 is applied to FET driver 224. FET driver 222 turns on FET T2 when a high level is applied thereto. FET driver 224 turns on FET T4 when a high level is applied thereto.

On the other hand, FET driver 221 for driving FET T1 is connected to output port OP8, and FET driver 223 for driving FET T3 is connected to output port OP9, FET driver 221 turns on FET T3 when a high level is applied thereto, and FET driver 223 turns on FET T3 when a high level is applied thereto. That is, when the direction control signal from OP8 is at the high level, FET T1 is turned on, and only when the current control signal is at a high level, is FET T2 turned on, so that a current proportional to the current control signal is applied to motor 8 to cause forward rotation thereof. When the direction control signal from OP9 is at a high level, FET T3 is turned on, and only when the current control signal is at a high level does FET T4 turn on, so that the current proportional to the current control signal is supplied to motor 8 for generating the reverse rotation thereof.

Motor energizing current IM is detected as the voltage of both ends of shunt resister R by means of current limiting unit 230. This voltage is amplified by a linear amplifier including operation amplifier 231, which is the important component, after the surge is removed and is supplied to each of the comparators including operation amplifier 232 (below referred to as the load limiting comparator) and the comparator including operation amplifier 231 (below referred to as the driving prohibiting comparator). These comparators have the hysterisis characteristics. The former performs a comparison of the load limiting voltage V1, and the latter executes a comparison of driving prohibiting voltage V2 which is higher than the load limiting voltage V1. That is, if motor energization current IM exceeds the load limiting value (the current value corresponding to V1), the output of the driving prohibiting comparator is converted into a low level (and the output of the driving prohibiting comparator is applied to input port IP2 to be used for other controls, a description of the other controls is omitted herein).

The output of the load limiting comparator is supplied to AND gate AN3 of PWM unit 210 and is changed into the low level, so that the PWM signal is hindered at AND gate AN3. In other words, when even at the on duty of PWM signal motor energizing current IM is increased by the lock of motor 8, etc., and exceeds the load limiting value motor 8 is deenergized by a force to protect each of the structured elements.

This will be described below in detail with reference to the wave form of each portion as indicated in FIG. 8, When at the on duty of PWM signal flowing through the line the overload of motor 8 occurs, motor energizing current IM is increased, and the potential at point b is increased. If this potential is over load limiting voltage V1, the output of the load limiting comparator, that is, the level at point c is converted into the low level, and the output of AND gate AN3, that is, the current limiting signal passing through point d is made to be at a low level. Thus, FET driver 222 or 224 turns off FET T1 or T2, so that motor energizing current IM is cut off and the potential at point b begins to decrease. When the potential at point b decreases to below the lower value by the predetermined value α defined by the hysterisis characteristics of the load limiting comparator than load limiting voltage V1, the output of the load limiting comparator is changed into the high level.

Then, if the on duty during the overload condition of motor 8 is continued, the load limiting comparator converts it's output into the high level, and the current limiting signal passing through the point b is returned to the high level, at that time motor energizing current IM is again increased to an oscillating condition, immediately, and this motor driving circuit forces the on/off of the motor to be repeated, the speed depending upon the responsive speed of current limiting unit 230.

Generally, the responsive speed of current limiting unit 230 is set at a high speed in view of the protection of each of the components structured (if slowed, the components are not protected due to the overshoot of the current). Due to this overload condition of motor 8, it's on/off frequency is made to have a Very high value (FIG. 8 schematically represents the Wave form).

On the other hand, PWM signal is set at the optimum frequency considering the responsive characteristics of each component forming the motor driving circuit, so that the on duty is chopped at the high speed to cause the switching loss of the switch element or the increase of the radiating noise.

SUMMARY OF THE INVENTION

An object of the present invention is to provide a motor driving apparatus for limiting the current applied during overload of the motor to an optimum condition.

To accomplish the above object the present invention is configured so that when the motor driving apparatus for controlling the output of the motor by PWM control applies a current to the motor which exceeds a predetermined value, the current applied to the motor is not supplied for a predetermined time.

According to the present invention, when the current applied to the motor exceeds the predetermined value, the motor is stopped for the predetermined time with the current not being applied thereto, so that the components are protected, and it is possible to prevent the apparatus from falling into the oscillating condition.

Particularly, if the blocking of the current applied to the motor is initially synchronized to the cycle of PWM signal, it is possible to limit the current applied to the motor during the overload of the motor without changing the PWM cycle.

BRIEF DESCRIPTION OF DRAWINGS

These and other objects as well as advantages of the present invention will become clear by the following description of a preferred embodiment of the present invention with reference to the accompanying drawings, wherein:

FIG. 4 is a flow chart for describing the operation of the microcomputer 100 shown in FIG. 1a;

PREFERRED EMBODIMENTS OF THE INVENTION

Figure 1A:
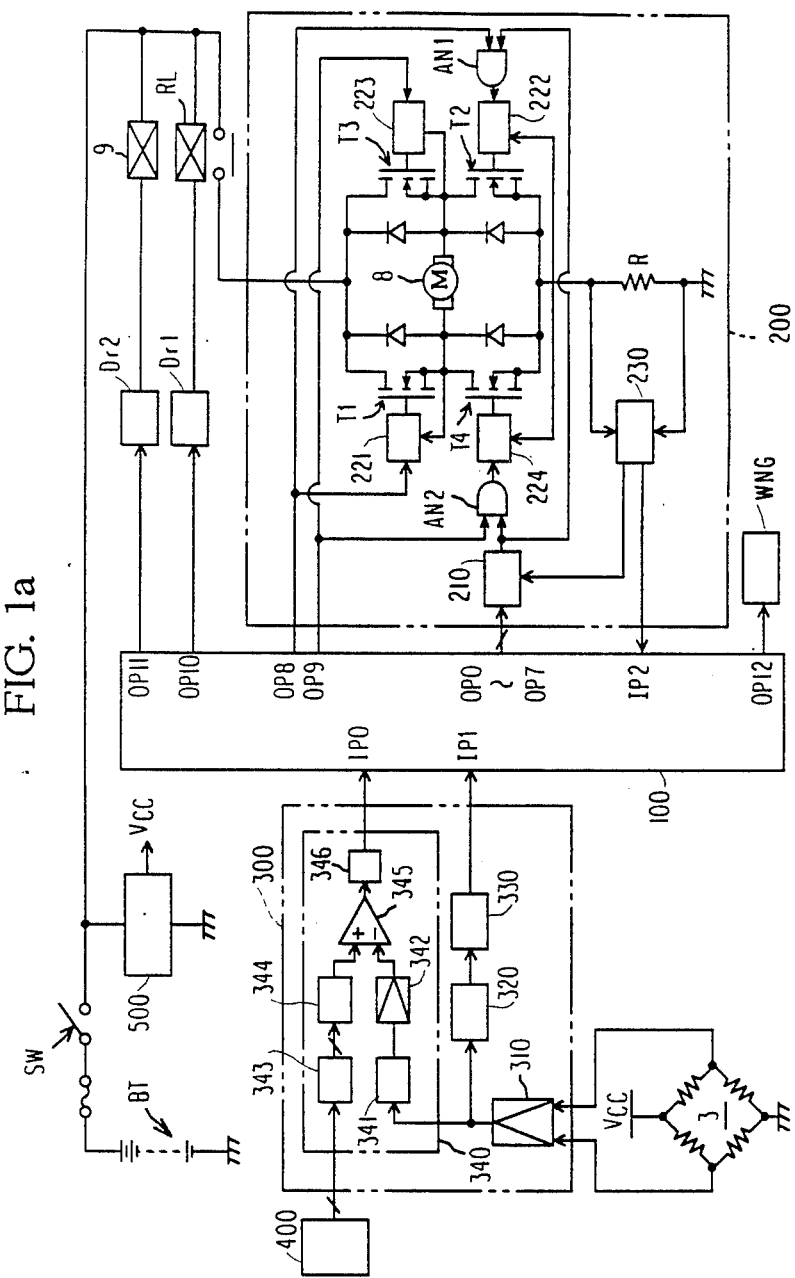
FIG. 1a is a block diagram view representing the electrical control system of the electrical power steering apparatus according to one embodiment of the present invention.
Figure 1B:
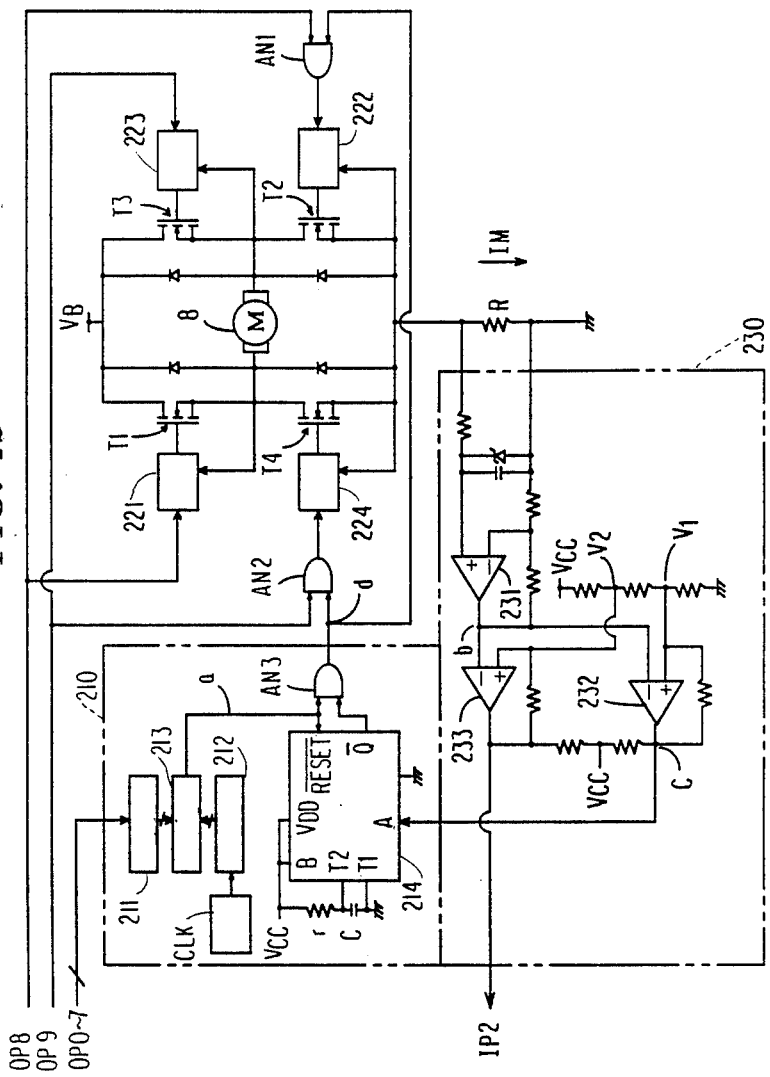
FIG. 1b is a block diagram representing portions of FIG. 1a in detail.
Figure 2:
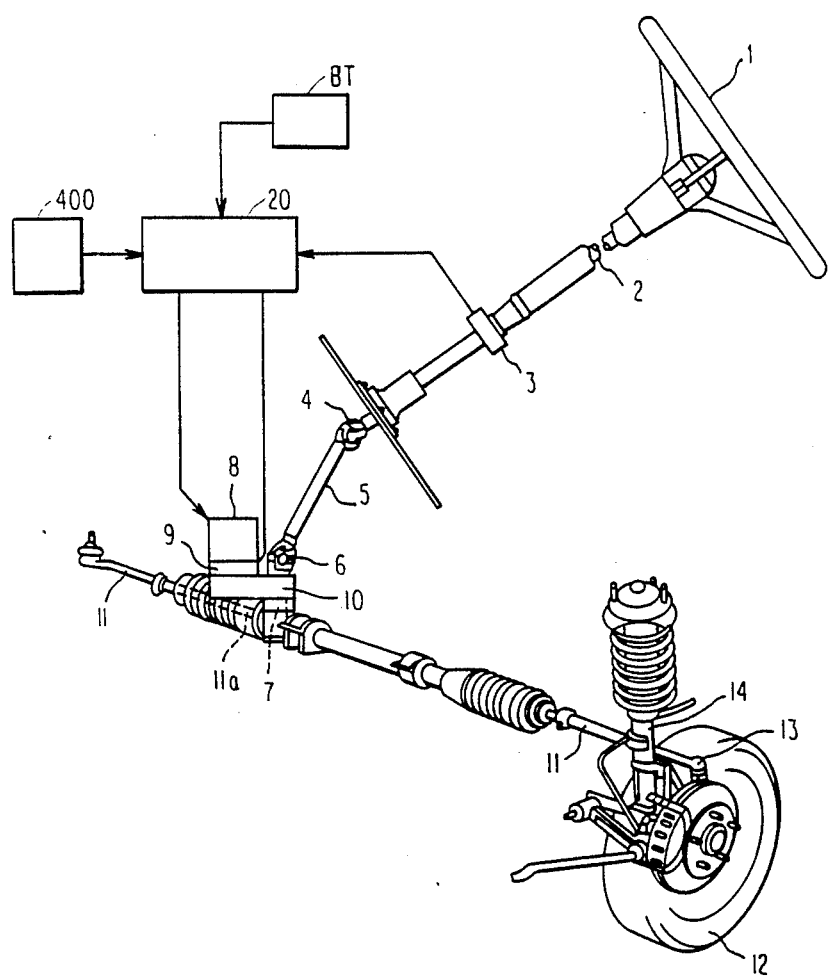
FIG. 2 is a perspective view representing the mechanical configuration of the electrical power steering apparatus.

FIG. 1a is a block diagram representing the electrical control system of the electrical power steering according to one embodiment of the present invention. FIG. 1b is a block diagram view representing a portion thereof in detail, and FIG. 2 is a perspective view representing the mechanical configuration of the electrical power steering apparatus. First, the mechanical configuration will be explained below with reference to FIG. 2.

Torque sensor 3 is mounted in steering upper shaft 2 to which steering wheel 1 is fixed and is coupled through first universal joint 4, intermediate shaft 5 and second universal joint 6 to steering lower shaft 7. To steering lower shaft 7 there is coupled a pinion gear (not shown). This pinion gear is engaged to rack 11a, which is fixed to tie rod 11. Tie rod 11 is coupled to a knuckle arm 13 extending from knuckle fixing wheel 12, knuckle 11 is coupled through strand 14 to rotate or move up and downward freely.

The rotation operation of steering wheel 1 is transferred through steering upper shaft 2, first universal joint 4, intermediate shaft 5, second universal joint 6 and steering lower shaft 7 to the pinion gear, and the rotation operation of steering wheel 11 is then converted into the axial direction of tie rod 11. Knuckle arm 13 is deviated from strand 14, so that wheel 12 is rotated around strand 14 according to the axial movement of tie rod 11.

On the other hand, motor is also coupled through speed reducer 10 and clutch 9 to the pinion gear engaged with rack 11a. That is, if clutch 9 is continuously connected to motor 8, the pinion gear is rotated according to the forward and reverse rotation of motor 8, and wheel 12 is rotated around strand 14 as described above.

Motor 8 and clutch 9 are controlled by control unit 20.

Control unit 20 and its peripheral circuit will be explained below with reference to FIG 1a.

Control unit 20 comprises microcomputer (below referred to as CPU) 100, motor driving unit 200 and torque detecting unit 300, etc. The predetermined voltage from battery BT and constant voltage unit 400 connected to battery BT is supplied to each of the components. To torque detecting sensor 300 there are connected torque sensor 3 mounted in steering upper shaft 2 and vehicle speed detecting unit 400.

Torque sensor 3 comprises two pairs of the distortion resistor elements, and in each of the pairs the distortion of steering upper shaft 2 is acted contrary to each other by the steering torque applied from steering wheel 1. These resistors form a bridge circuit, and the center potential of each of the pairs is inputted to differential amplifier 310 of torque detecting unit 300. Differential amplifier 310 linearly amplifies the potential difference between them and applies the amplified difference to PID compensating circuit 320 and abnormal detecting circuit 340.

PID compensating circuit 320 is the circuit for compensating for the phase distortion of the detecting torque occurring in the mechanical configuration or the steering apparatus, and its output is applied to A/D comparator 330. A/D comparator 330 converts the input signal into a digital signal and then transfers the converted digital signal to the serial port of CPU 100 as the torque data representing the steering torque supplied from steering wheel 1.

Abnormal detecting circuit 340 is the circuit setting the abnormal by detecting the torque which exceeds the tolerance scope. That is to say, the voltage signal corresponding to the detecting torque output from differential amplifier 310 includes the positive and negative value, so that absolute value circuit 341 performs the processing of the absolute value and also after amplifier 342 adjusts the level, comparator 345 compares the tolerance value of the detecting torque with the reference potential as shown in the drawing. Comparator 345 outputs the low level if the detecting torque exceeds the tolerance scope (the tolerance value in the absolute value).

Then, this embodiment sets the tolerance scope according to the vehicle speed. Preferably, if the vehicle speed data supplied from vehicle speed detecting unit 400 is input into comparator 343 provided with a table corresponding to the vehicle speed and the reference potential comparator 343 outputs the reference potential data, so that D/A comparator 344 converts the reference data into an analog signal and applies its signal to comparator 345 as the reference potential.

The output of comparator 345 is applied through integrating circuit 346 to the input port IPO of CPU 100. This integrating circuit 346 removes the instant abnormal output of torque sensor 3 by the condition or the road surface or the oscillation.

Figure 7:
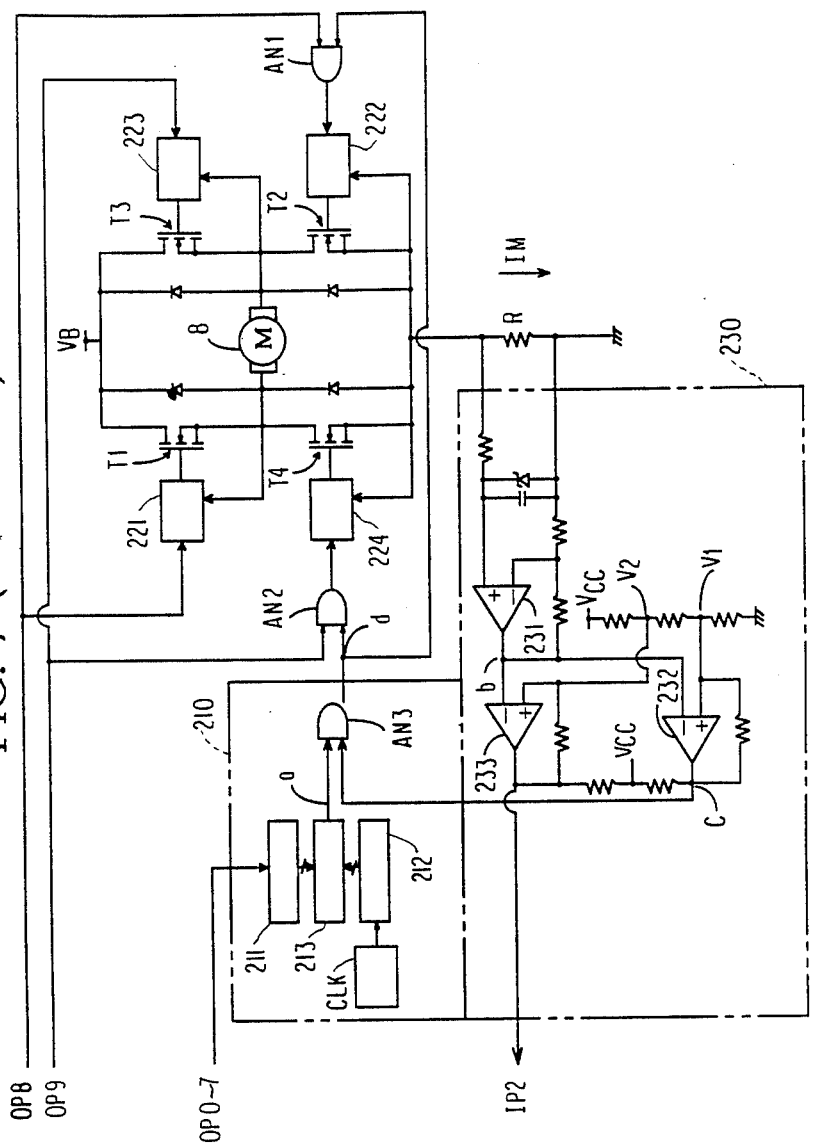
FIG. 7 is a block diagram representing a conventional embodiment.

The details of motor driving unit 200 is illustrated in FIG. 1b. In this drawing the elements are the same as in FIG. 7. The explanations differ from those as described, and are explained below.

In this embodiment, PWM unit 210 is provided with monostable multivibrator 214. This multivibrator 214 is triggered by the negative edge of the signal applied to set terminal A and outputs the low level pulse of the time constant $\tau$ (defined by resistance r and capacitance c from Q' terminal) the drawing represents Q' as a Q with an overline). At this time, if the low level is applied to the RESET terminal, the output is initialized. The output of the load limiting unit 230, which comprises operation amplifier 232 of current limiting unit 230 as described above is applied to SET terminal and PWM signal output from said comparator 213 is applied to RESET terminal, Also, the output of Q' terminal is applied to AND gate AN3 having two inputs. Also, this embodiment sets the time constant to be relatively longer at the cycle of PWM signal.

Figure 3:
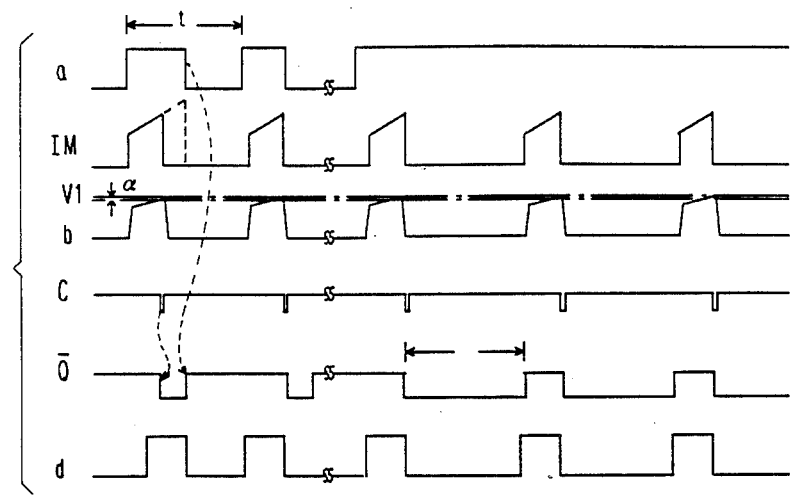
FIG. 3 is a wave form diagram for the block diagram of FIG. 1b.
Figure 8:
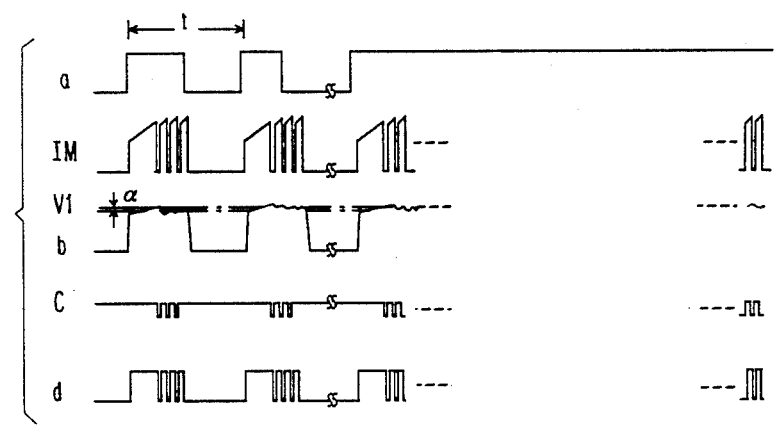
FIG. 8 is a wave form diagram for describing the operation of FIG. 7.

The operation of each portion constructed as described above will be explained with reference to the wave form illustrated in FIG. 3. If the overload of motor 8 occurs by the on duty of PWM signal (cycle $\tau$) flowing through the line, motor energizing current IM is increased and the potential at point b is increased.

If the potential exceeds load limiting voltage V1, the output of the load limiting comparator, such as the level at the point b, is converted into the low level and triggers monostable multivibrator 214. Thus, monostable multivibrator 214 converts the output of Q' terminal into the low level, and AND gate AN3 receiving said low level blocks PWM signal. That is, the current control signal passing through point d is made into the low level, so that FET driver 222 or 224, or FET T1 or T2 is turned off and motor energizing current IM is cut off.

Thereafter, even though the potential at the point b is reduced, the time constant $\tau$ of monostable multivibrator 214 is set at a time which is longer than the cycle t of PWM signal, and therefore motor 8 should not be energized again at the cycle. Also, monostable multivibrator 214 is reset at the off duty of PWM signal applied to RESET terminal before its Q' output is converted into the high level and repeats the operation.

That is to say, motor 8 is electrically connected only one time at one time cycle of PWM signal independent of the overload of motor 8, so that the cycle of PWM signal is always kept. In other words, it is possible to limit the current applied to the motor at the optimum condition even though the overload is caused at motor 8.

Referring to FIG. 1a, relay Dr1 is connected to output port OP10 of CPU 100, clutch driver Dr1 is connected to OP11, and abnormal display unit WGN is connected to OP12, respectively. Relay driver Dr1 controls the energization/deenergization of relay RL having the relay connection point formed in the line of motor 8 responsive to the instructions of CPU 100. Clutch driver Dr2 controls the energization and deenergization of clutch 9 responsive to the instructions of CPU 100. Also, a display unit WNG is installed in the instrument housing and serves to display an abnormal condition in responsive to the instructions of CPU 100.

Figure 4:
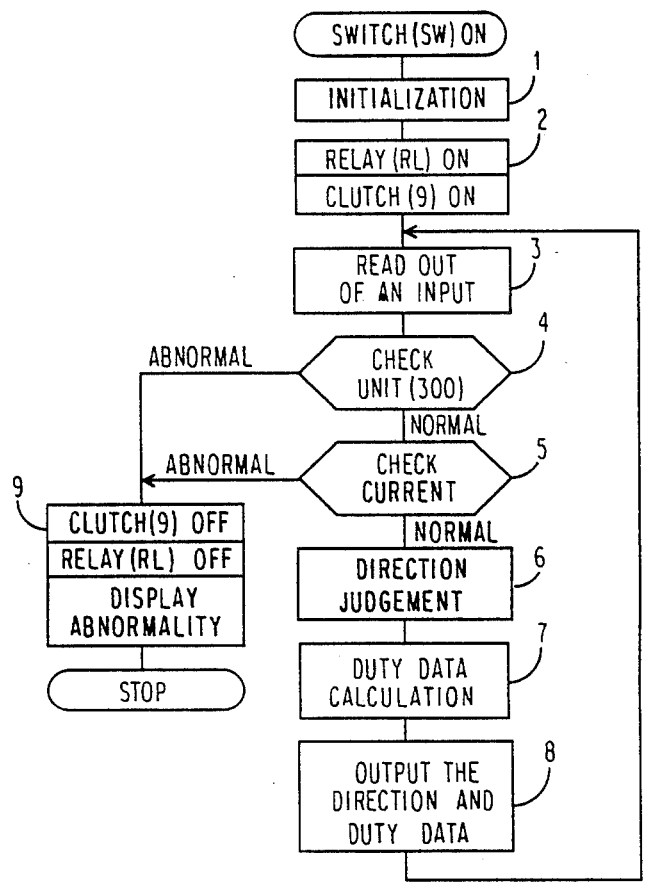

Next, the control operation of CPU 100 will be explained with reference to the flow chart as shoWn in FIG. 4.

When ignition switch SW is on, at S1 (representing the step number in connection with the flow chart) the condition of the input and output port and each component is initialized. Then, when the instructions for the energization of relay RL and clutch 9 are respectively performed with respect to driver Dr1 and Dr2 at S2, the read out of the input is performed at S3. The torque data obtained from torque detecting unit 300 and the signal representing the abnormal condition of the detecting torque, and the signal representing the abnormal condition of the motor energizing current obtained from the driving prohibiting comparator of current limiting unit 230 are read out. At that time, if the abnormal condition is not found in the detecting and the energization current, the energizing direction of motor 8 (corresponding to the rotation direction of steering wheel 1) is judged by the code of torque data at S6. After the on duty of motor 8 rather than the size of the torque data is calculated at S7, the direction control signal and the duty data are output to motor driving unit 200 at S8.

Unless the abnormal condition in the detecting and the motor energizing current is presented, the processing of S3 to S8 is repeated, and the auxiliary torque proportional to the size of the torque, which in the motor the driver is applied to the steering wheel, is exerted toward its rotation direction.

If the abnormal condition in the detecting torque and/or the motor energizing current has occurred, S4 or S5 then proceeds to S9 and the instructions for the deenergization of relay RL and clutch 9 are performed with respect to driver Dr1 and Dr2, respectively. Thus, motor 8 is mechanically separated from the steering apparatus and also is cut off from the power line. Thereafter, unless ignition coil switch SW is again turned on, CPU 100 is not again operated. That is to say, if the seriously abnormal condition causing the abnormal of the torque detecting or the abnormal energizing of motor 8 occurs, the manual steering apparatus is configured so that the power assist control is cut off.

At this time, it is known that in motor driving unit 200 as shown in FIG. 1 that the exceptional case incapable of keeping the cycle of PWM control exists only one time. This case exists only when the on duty is 100 as shown in FIG. 4. At this case, according to the PWM signal monostable multivibrator 214 is not reset, so that PWM control having the cycle of the time constant $\tau$ is performed. Of course, it does not present a problem if the duty 100 is prohibited, but it is hindered if the driving control of motor 8 is intended to perform at the full range.

Figure 5:
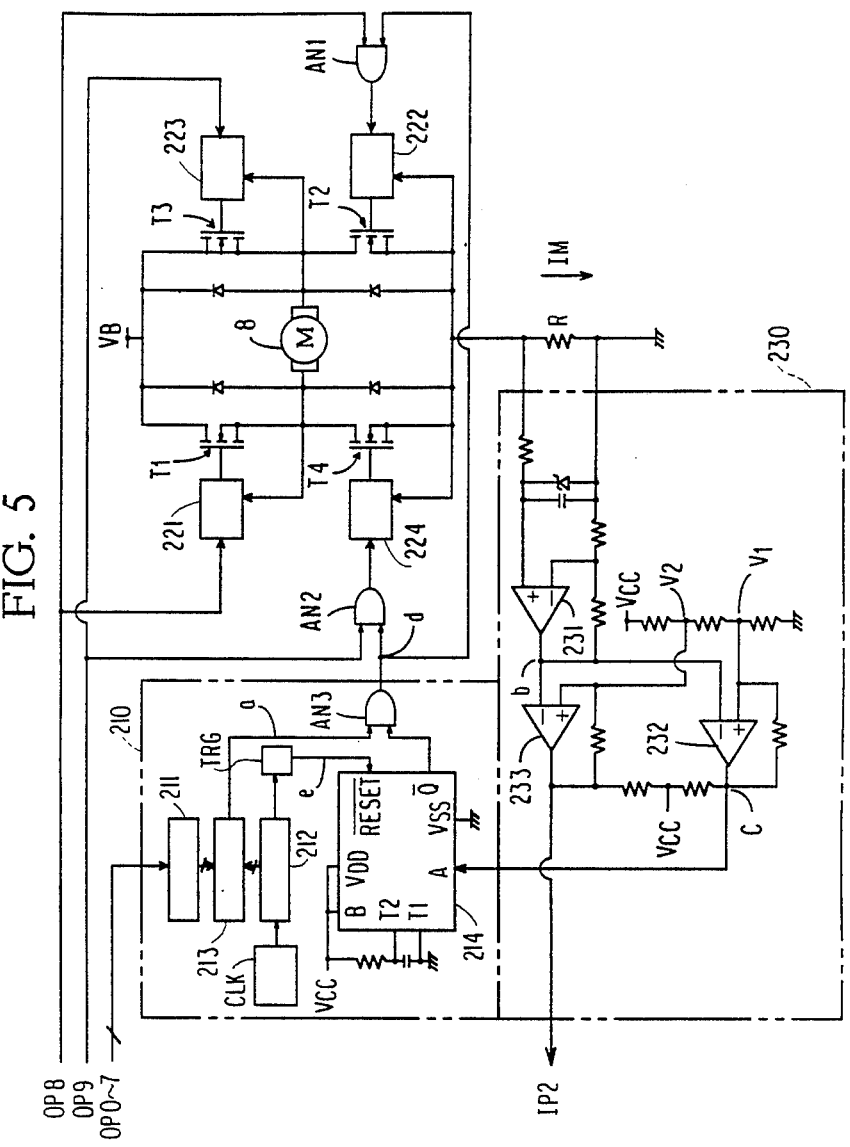
FIG. 5 is a block diagram representing a modified embodiment according to the invention.

Motor driving unit 200, which the configuration of the embodiment has partly been modified and can control, the driving of motor 8 in the full range is shown in FIG. 5. Herein, the output of the most significant bit from 100 binary counter 212 of PWM unit 210 is independently read out and is applied to trigger circuit TRG. Trigger circuit TRG is triggered and outputs the reset pulse when the negative edge of the most significant bit, such as the counter data of counter 212, is changed into 0 from 99. This reset pulse is applied to the RESET terminal of monostable multivibrator 214.

Figure 6:
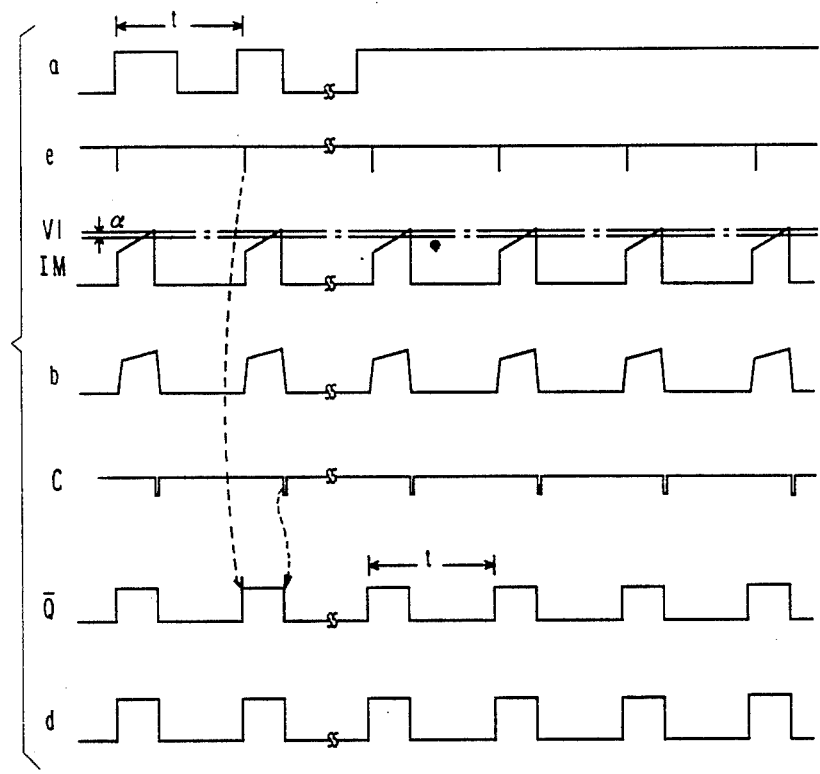
FIG. 6 is a wave form diagram for describing the operation of FIG. 5.

Referring to the wave form view shown in FIG. 6, the explanation of the portion overlapped by the above explanation is omitted, but according to the drawing, monostable multivibrator 214 is not reset by PWM signal and is reset by the reset pulse synchronized at the alternative cycle of PWM signal which passes through line e, it is known that the output of Q' terminal is repeated at the cycle t. That is, nevertheless, the overload of motor 8 exists or otherwise, at any case the cycle, that the current is applied thereto, is kept at the cycle t.

As explained above, according to the present invention it is possible to keep the cycle of the PWM signal and to control the current applied thereto in the optimum condition even when the overload of the motor has occurred. Thus, even though the optimum frequency of PWM control is set in light of the responsive characteristics of each of components forming the conventional motor driving circuit, the present invention resolves the defaults that the frequency is changed into the high frequency during the overload of the motor and the increasing of the switching loss or the radiating noise occurs.

What is claimed is:

1. A motor driving apparatus including a motor controllable to be switched on and off during each cycle of operation, a Pulsed Width Modulation circuit for controlling the on and off times of said motor during each cycle of operation, and a current supplying means for supplying current to said motor, the apparatus comprising:

current detecting means for detecting the current flowing through said motor; and current prohibiting means for prohibiting current from being supplied to said motor when said current detecting means detects that the current flowing through said motor exceeds a predetermined level, said current prohibiting means continuing to prohibit current from being supplied to said motor after said current detecting means detects that the current flowing through said motor exceeds the predetermined level until the next operation cycle of said motor so that said motor is connected to receive current only once per operation cycle.

2. The motor driving apparatus as defined in claim 1, further comprising a torque sensor, and a torque detecting circuit for detecting the output of said torque sensor, said Pulse Width Modulation circuit controlling the one and off times of said motor during each operation cycle in accordance with the output of said torque detecting circuit.

3. The motor driving apparatus as defined in claim 1, further comprising generating means for generating a Pulse Width Modulation binary signal in accordance with the output of said torque detecting circuit, said Pulse Width Modulation circuit controlling the on and off times of said motor in accordance with the generated Pulse Width Modulation binary signal.

4. The motor driving apparatus as defined in claim 3, wherein said generating means comprises a CPU.

5. The motor driving apparatus as defined in claim 1, wherein said means for supplying current to said motor includes a plurality of transistors, each of said plurality of transistors being coupled to an associated transistor driver.

* * * * *